(12) United States Patent
Feng

(10) Patent No.: US 11,772,308 B2
(45) Date of Patent: Oct. 3, 2023

(54) INTRA-MODE MOULDING FOAM MOLDING DEVICE OF THERMOPLASTIC POLYMER PARTICLE AND MOLDING METHOD FOR SAME

(71) Applicant: Guangdong Speed New Material Technology Co., Ltd, Guangdong (CN)

(72) Inventor: Yunping Feng, Guangdong (CN)

( * ) Notice: Subject to any disclaimer, the term of this patent is extended or adjusted under 35 U.S.C. 154(b) by 464 days.

(21) Appl. No.: 16/925,502

(22) Filed: Jul. 10, 2020

(65) Prior Publication Data

US 2020/0338794 A1    Oct. 29, 2020

Related U.S. Application Data

(63) Continuation-in-part of application No. PCT/CN2019/099734, filed on Aug. 8, 2019.

(30) Foreign Application Priority Data

Sep. 8, 2018 (CN) .......................... 201811046576.6

(51) Int. Cl.
*B29C 44/34* (2006.01)
*B29C 44/44* (2006.01)
*B29C 44/60* (2006.01)
*B29K 101/12* (2006.01)

(52) U.S. Cl.
CPC ........ *B29C 44/3403* (2013.01); *B29C 44/445* (2013.01); *B29C 44/60* (2013.01); *B29K 2101/12* (2013.01)

(58) Field of Classification Search
CPC ....... B29C 44/10; B29C 44/105; B29C 44/34; B29C 44/36; B29C 44/58; B29C 44/60; B29C 44/44; B29C 44/445; B29C 44/3403; B29C 44/343; B29C 44/3426; B29C 44/3453

See application file for complete search history.

(56) References Cited

U.S. PATENT DOCUMENTS 3,871,801 A * 3/1975 Buchmann ............ B29C 44/445
                                                    425/258
4,196,160 A * 4/1980 Sperry .................... B29C 44/10
                                                    264/294

(Continued)

*Primary Examiner* — Seyed Masoud Malekzadeh

(57) ABSTRACT

An intra-mode moulding foam molding device of thermoplastic polymer particles and a molding method thereof. The device includes a supercritical fluid delivery system, a mould pressing foaming system, a preheating quantitative feeding system and a moving rail; the supercritical fluid delivery system communicates with the mould pressing foaming system. Through a one-step foam molding method of polymer particles, polymer particles can be directly added into a molding cavity without pre-foaming, water and anti-sticking separating agent are not needed; the molding process does not need high-pressure water vapor for warming and molding, and has great adhesion force and is also clean, therefore polymer materials are easy to hydrolyze. The processing needs few heat, the heating efficiency of the polymer particles is high, the temperature of the polymer particle is uniform, and a polymer particle microcellular foamed mould pressing molded product having fine pores, precise size and light weight is obtained.

10 Claims, 1 Drawing Sheet

(56) References Cited

U.S. PATENT DOCUMENTS

| | | | | |
|---|---|---|---|---|
| 5,238,624 A | * | 8/1993 | Bazzica | B29C 44/445 |
| | | | | 425/186 |
| 2003/0038392 A1 | * | 2/2003 | Weber | B29C 44/105 |
| | | | | 425/4 R |

* cited by examiner

INTRA-MODE MOULDING FOAM MOLDING DEVICE OF THERMOPLASTIC POLYMER PARTICLE AND MOLDING METHOD FOR SAME

BACKGROUND OF THE INVENTION

The disclosure pertains to the technical field of foam molding of polymer particles, and more particularly to an intra-mode moulding foam molding device of a thermoplastic polymer particle and a molding method for the same.

At present, a batch reactor foaming method is typically used in industry to produce polymer foamed beads. The process is as follows: a thermoplastic polymer resin composition is extruded, and then cut into polymer particles with an average particle size of 0.5-4 mm through underwater cutting; then the polymer particles, water and a water dispersing medium are jointly added into a constant-temperature high-pressure reactor to be heated to a temperature higher than the softening point of the polymer through a heating device; under the action of agitation, and supercritical fluid is introduced for permeation and swelling to reach diffusion balance, thereby forming a polymer-supercritical fluid homogeneous system; then the pressure in the system is released to obtain polymer foaming beads; the foamed beads obtained by pressure relief are washed in a water tank, and then a dispersing agent adhered to the surfaces of the foamed beads is removed; finally, the polymer beads are welded to form a variety of formed products by a water vapor mould molding method.

Chinese Patent CN 102167840A discloses a method for preparing polymer microcellular foamed material by supercritical press molding foaming, which comprises the following steps: heating up a foaming mould on a mould pressing machine, then putting a polymer into a mould after a foaming temperature is reached, closing the mould pressing machine, sealing the mould, introducing supercritical fluid into the mould so that the supercritical fluid is swelled and diffused toward the polymer, and then opening the mould pressing machine for pressure relief and foaming, so as to obtain a polymer microcellular foamed material. However, the above method can only be used for fabricating foamed products with the shapes of particles rods, sheets and plates, and cannot be adapted to the needs of multiple products having different shapes.

Chinese Patent CN 104097288A discloses a supercritical fluid assisted polymer mould pressing foaming device. The device includes a supercritical fluid delivery system, a mould system, a temperature measurement device, a pressure measurement device, a pressure release device and a display and control system, wherein the supercritical fluid delivery system is connected with the mould system, and the temperature measurement device, the pressure measurement device and the pressure release device are respectively connected with the mould system. The mould system utilizes the upper and lower hot plates of the mould pressing machine for heating. The supercritical fluid is gradually diffused into a polymer matrix after a certain period of time under the action of certain temperature and supercritical fluid pressure by using the super-strong permeation and diffusion capability of supercritical fluid, and then the pressure in the mould is quickly released to obtain a foamed material having a certain shape. The device can be used for free foaming or controllable foaming. However, the above foaming device is only suitable for preparation of small-scale simple-shape foamed materials, or preparation of a standard foamed material sample for testing, and is not applicable to large-scale industrial production.

The production manner of the foaming device and method described above is as follows: a preform having a simple shape is prepared in advance to be put in a mould, supercritical fluid is gradually diffused into a polymer matrix after a certain period of time under the action of certain temperature and supercritical fluid pressure by using the super-strong permeation and diffusion capability of supercritical fluid, and then the pressure in the mould is quickly released to obtain a foamed material having a certain shape. Through adoption of the above foaming device and method, the complexity of the foaming process is increased and the input of equipment fund is increased so that production cost is increased. Furthermore, the above device and method are low in production efficiency, high in production cost, and not suitable for large-scale industrial production.

BRIEF SUMMARY OF THE INVENTION

The objective of the disclosure is to overcome the above defects in the prior art, and provide a thermoplastic polymer particle microcellular foaming press molding product having fine pores, a precise size and a light weight, so as to effectively ensure the consistency of foaming, improve production efficiency, realize automatic production, and adapt to an intra-mode moulding foam molding device of a thermoplastic polymer particle and a molding method thereof.

In order to achieve the above objective, the disclosure provides an intra-mode moulding foam molding device of a thermoplastic polymer particle, comprising a supercritical fluid delivery system, a mould pressing foaming system, a preheating quantitative feeding system and a moving rail, wherein the supercritical fluid delivery system is communicated with the mould pressing foaming system, the moving rail is arranged under the mould pressing foaming system and the preheating quantitative feeding system, the mould pressing foaming system is arranged on the moving rail, and the mould pressing foaming system and the preheating quantitative feeding system are connected through the moving rail.

Preferably, the supercritical fluid delivery system comprises a nitrogen booster station, a carbon dioxide booster station, a nitrogen liquid storage tank and a carbon dioxide liquid storage tank, wherein the output end of the nitrogen liquid storage tank is communicated with the inlet end of the nitrogen booster station, the output end of the carbon dioxide liquid storage tank is communicated with the inlet end of the carbon dioxide booster station, the inlet end of the nitrogen booster station is connected with the inlet end of the carbon dioxide booster station and communicated with the mould pressing foaming system through a pipeline, and intake valves are arranged between the inlet ends of the nitrogen booster station and the carbon dioxide booster station and the mould pressing foaming system.

Preferably, the mould pressing foaming system comprises a foaming mould, a booster mould-clamping cylinder, a temperature control device, a pressure control device, a pressure release device, a vent valve, a silencer and a cooling device, wherein the foaming mould is arranged on the moving rail and moves left and right relative to the moving rail, the booster mould-clamping cylinder is arranged on the foaming mould, the temperature control device and pressure control device are arranged on the foaming mould, the cooling device is arranged on the foaming mould, the pressure release device is arranged on the foaming mould, the silencer is arranged on the pressure release device, the foaming mould is provided with the vent valve, the foaming mould is connected with the preheating quantitative feeding system through the moving rail and arranged under the preheating quantitative feeding system, and the supercritical fluid delivery system is communicated with the inside of the foaming mould.

Preferably, the foaming mould comprises an upper template and a lower template, a plurality of molding mould cavities are arranged between the upper template and the lower template, air circulation channels communicated with the supercritical fluid delivery system are provided between the lower template and the molding mould cavities and between the molding mould cavities and the upper template, the lower template is arranged on the moving rail and moves left and right relative to the moving rail, the booster mould-clamping mould cylinder is arranged on the upper template and in drive connection with the upper template so as to drive the up and down movement of the upper template, and the lower template is connected with the preheating quantitative feeding system through the moving rail and arranged under the preheating quantitative feeding system.

Preferably, the preheating quantitative feeding system comprises a polymer particle preheating device, a quantitative feeding device and a temperature control device, wherein the polymer particle preheating device is communicated with the quantitative feeding device, the temperature control device is arranged on the polymer particle preheating device, the quantitative feeding device is arranged above the lower template, the quantitative feeding device is provided with a plurality of feeding heads corresponding to the molding mould cavities on the lower template.

The disclosure provides a molding method for an intra-mode moulding foam molding device of a thermoplastic polymer particle, comprising the following steps:

1) adding polymer particles into a polymer particle preheating device to be preheated, regulating a preheating temperature through a temperature control device according to the added polymer particles, and then delivering the polymer particles into a quantitative feeding device;

2) moving a lower template under the quantitative feeding device along a moving rail, adding the preheated polymer particles into the molding mould cavity of the lower template through a feeding head of a quantitative feeding device in a certain weight ratio;

3) moving the lower template which completes feeding under the upper template along the moving rail, and driving the upper template to downwardly move by the booster mould-clamping cylinder to be locked and sealed with the upper template; and 4) opening an intake valve, introducing supercritical fluid toward the foaming mould from the supercritical fluid delivery system, regulating the temperature and pressure of the introduced supercritical fluid to a target temperature and a target pressure, swelling and diffusing the supercritical fluid toward the polymer for certain time, opening a pressure release device for pressure relief and foaming to obtain a polymer press molding microcellular foamed product having controllable product shape, size precision, pore finesse and product density.

Preferably, the pressure of the supercritical fluid is 5-30 MPa, and the supercritical fluid is swelled and diffused toward the polymer for 30-120 min.

Preferably, the supercritical fluid is supercritical carbon dioxide or supercritical nitrogen or a mixture thereof.

Preferably, the obtained polymer press molding microcellular foamed product has a volume expansion rate of 10-50 folds and an average pore diameter of 1-100 μm.

Preferably, the preheating temperature of a semi-crystalline polymer is 5-10° C. below the melting point of the semi-crystalline polymer, and the preheating temperature of an amorphous polymer is 5-10° C. below the vitrification temperature of the amorphous polymer.

Compared with the prior art, the disclosure has the beneficial effects:

the device of the disclosure is simple in structure and includes the supercritical fluid delivery system, the mould pressing foaming system, the preheating quantitative feeding system and the moving rail, the supercritical fluid delivery system is connected with the mould pressing foaming system, the moving rail is arranged under the mould pressing foaming system and preheating quantitative feeding system, the mould pressing foaming system is arranged on the moving rail, the mould pressing foaming system and the preheating quantitative feeding system are connected through the moving rail, the polymer particles are placed in the preheating quantitative feeding system to be preheated and injected into the mould pressing foaming system, the supercritical fluid delivery system introduces supercritical fluid into the mould pressing foaming system, the supercritical fluid is swelled and diffused toward the polymer, and the pressure release device is opened for pressure relief and foaming to obtain the polymer press molding microcellular foamed product. Through the one-step foam molding method of polymer particles, polymer particles are directly added into a molding mould cavity without pre-foaming, addition of water and an anti-sticking separating agent is not needed, and a mould pressing welding formation process does not need high-pressure water vapor for warming and moulding, and is large in adhesion force and clean in process and suitable for polymer materials easy to hydrolyze. Meanwhile, the processing process needs few heat, the heating efficiency of the polymer particles is high, the temperature of the polymer particle is uniform, and a polymer particle microcellular foamed press molded product having fine pores, precise size and light weight is obtained. Through the method and device of the disclosure, the consistency of foaming is effectively ensured, production efficiency is improved, and automatic production is realized. The device and method of the disclosure are applicable to foaming and press molding of most polymer particles.

BRIEF DESCRIPTION OF THE DRAWINGS

For better illustrating the technical solution of embodiments of the disclosure, drawings required for describing embodiments will be explained below. Apparently, the drawings in the description below are only some embodiments, and those skilled in the art can also obtain other drawings according to these drawings without any creative efforts.

DETAILED DESCRIPTION OF THE INVENTION

To make the purpose, the features and the benefits of the disclosure more clear, the technical solution in embodiments of the disclosure will be clearly and completely described below in conjunction with embodiments of the disclosure. Based on embodiments of the disclosure, other embodiments obtained by those of ordinary skill in the art without any creative efforts all belong to the scope of protection of the disclosure.

Embodiment 1

Figure 1:
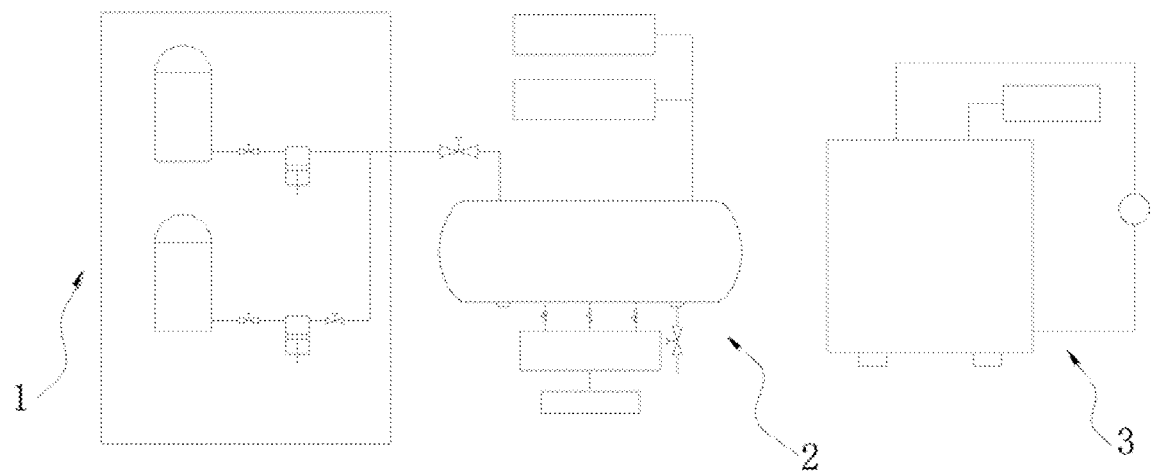
FIG. 1 is a structural diagram of an intra-mode moulding foam molding device of a thermoplastic polymer particle according to the disclosure.
Figure 2:
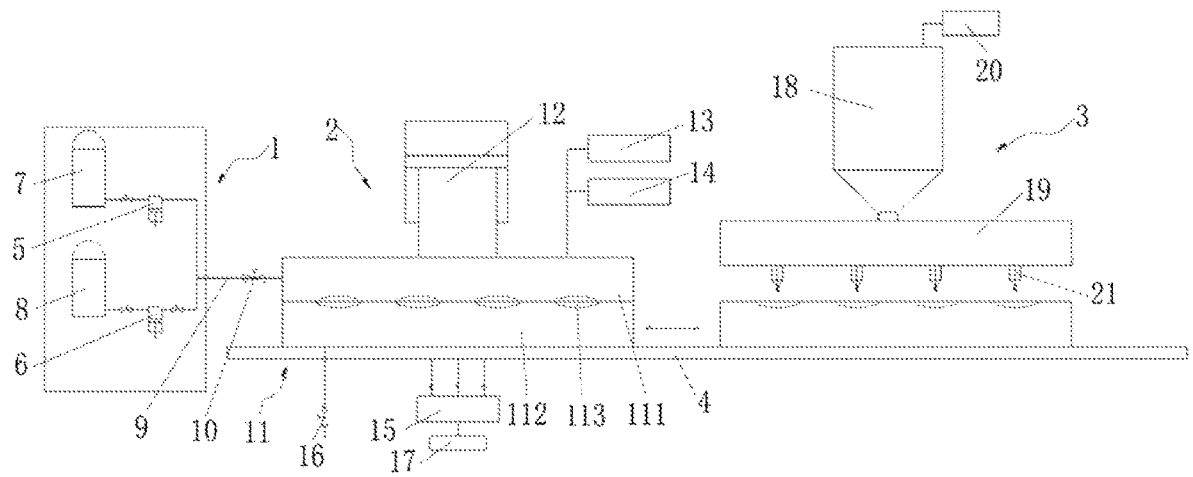
FIG. 2 is another structural diagram of an intra-mode moulding foam molding device of a thermoplastic polymer particle according to the disclosure.

Referring to FIG. 1 and FIG. 2, an embodiment of the disclosure provides an intra-mode moulding foam molding device of a thermoplastic polymer particle, comprising a supercritical fluid delivery system 1, a mould pressing foaming system 2, a preheating quantitative feeding system 3 and a moving rail 4, wherein the supercritical fluid delivery system 1 is communicated with the mould pressing foaming system 2, the moving rail 4 is arranged under the mould pressing foaming system 2 and the preheating quantitative feeding system 3, the mould pressing foaming system 2 is arranged on the moving rail 4, and the mould pressing foaming system 2 and the preheating quantitative feeding system 3 are connected through the moving rail 4. This embodiment will be described in detail in combination with drawings.

As shown in FIG. 1, the supercritical fluid delivery system 1 is communicated with the mould pressing foaming system 2, the moving rail 4 is arranged under the mould pressing foaming system 2 and the preheating quantitative feeding system 3, the mould pressing foaming system 2 is arranged on the moving rail 4, and the mould pressing foaming system 2 and the preheating quantitative feeding system 3 are connected through the moving rail 4.

Specifically, as shown in FIG. 2, the supercritical fluid delivery system comprises a nitrogen booster station 5, a carbon dioxide booster station 6, a nitrogen liquid storage tank 7 and a carbon dioxide liquid storage tank 8, wherein the output end of the nitrogen liquid storage tank 7 is communicated with the inlet end of the nitrogen booster station 5, the output end of the carbon dioxide liquid storage tank 8 is communicated with the inlet end of the carbon dioxide booster station 6, the inlet end of the nitrogen booster station 5 is connected with the inlet end of the carbon dioxide booster station 6 and communicated with the mould pressing foaming system 2 through a pipeline 9, and intake valves 10 are ranged between the inlet ends of the nitrogen booster station 5 and the carbon dioxide booster station 6 and the mould pressing foaming system 2.

The mould pressing foaming system 2 comprises a foaming mould 11, a booster mould-clamping cylinder 12, a temperature control device 13, a pressure control device 14, a pressure release device 15, a vent valve 16 and a silencer 17, wherein the foaming mould 11 is arranged on the moving rail 4 and moves left and right relative to the moving rail 4, the booster mould-clamping cylinder 12 is arranged on the foaming mould 11, the temperature control device 13 and the pressure control device 14 are arranged on the foaming mould 11, the pressure release device 15 is arranged on the foaming mould 11, the silencer 17 is arranged on the pressure release device 15, the foaming mould 11 is provided with the vent valve 16, the foaming mould 11 is connected with the preheating quantitative feeding system 3 through the moving rail 4 and arranged under the preheating quantitative feeding system 3, and the supercritical fluid delivery system 1 is communicated with the inside of the foaming mould 11.

The foaming mould 11 comprises an upper template 111 and a lower template 112, wherein a plurality of formation mould cavities 113 are arranged between the upper template 111 and the lower template 112, the lower template 112 is arranged on the moving rail 4 and moves left and right relative to the moving rail 4, the booster mould-clamping mould cylinder 12 is arranged on the upper template 111 and in drive connection with the upper template 111 so as to drive the up and down movement of the upper template 111, the lower template 112 is connected with the preheating quantitative feeding system 3 through the moving rail 4 and arranged under the preheating quantitative feeding system 3.

The preheating quantitative feeding system 3 comprises polymer particle preheating device 18, a quantitative feeding device 19 and a temperature control device 20, wherein the polymer particle preheating device 18 is communicated with the quantitative feeding device 19, the temperature control device 20 is arranged on the polymer particle preheating device 18, the quantitative feeding device 19 is arranged above the lower template 112, the quantitative feeding device 19 is provided with a plurality of feeding heads 21 corresponding to the formation mould cavities on the lower template 112.

Through a one-step foam molding method of polymer particles, polymer particles are directly added into a molding mould cavity 113 without pre-foaming, addition of water and an anti-sticking separating agent is not needed, and a mould pressing welding molding process does not need high-pressure water vapor for warming and moulding, and is large in adhesion force and clean in process and suitable for polymer materials easy to hydrolyze. Meanwhile, the processing process needs few heat, the heating efficiency of the polymer particle is high, the temperature of the polymer particle is uniform, the consistency of foaming is effectively ensured, production efficiency is improved, and automatic production is realized. This method is applicable to foaming press molding of most polymer particles.

Embodiment 2

This embodiment 2 provides a molding method of an intra-mode moulding foam molding device of a thermoplastic polymer particle, comprising the following steps:

1) adding polymer particles into a polymer particle preheating device 18 to be preheated, regulating a preheating temperature through a temperature control device 20 according to the added polymer particles, and then delivering the polymer particles into a quantitative feeding device 19;

2) moving a lower template 112 under the quantitative feeding device 19 along a moving rail 4, adding the preheated polymer particles into the molding mould cavity 113 of the lower template 112 through a feeding head 21 of quantitative feeding device 19 in a certain weight ratio;

3) moving the lower template 112 which completes feeding under the upper template 111 along the moving rail 4, driving the upper template 111 to downwardly move by the booster mould-clamping cylinder 12 to be locked and sealed with the upper template 112; and 4) opening an intake valve 10, introducing supercritical fluid toward the foaming mould 11 from the supercritical fluid delivery system 1, regulating the temperature and pressure of the introduced supercritical fluid to a target temperature and a target pressure, swelling and diffusing the supercritical fluid toward the polymer, opening a pressure release device 15 for pressure relief and foaming to obtain a polymer press molding microcellular foamed product having controllable product shape, size precision, pore finesse and product density.

Preferably, in this embodiment, the pressure of the supercritical fluid is 5-30 MPa, and the supercritical fluid is swelled and diffused toward the polymer for 30-120 min.

Where, the supercritical fluid is supercritical carbon dioxide or supercritical nitrogen or a mixture thereof.

Where, the polymer press molding microcellular foamed product obtained by foaming has a volume expansion rate of 10-50 folds and an average pore diameter of 1-100 μm, and the polymer press molding microcellular foamed product having fine pores, a precise size and a light in weight is obtained.

Preferably, the preheating temperature of a semi-crystalline polymer is 5-10° C. below the melting point of the semi-crystalline polymer, and the preheating temperature of an amorphous polymer is 5-10° C. below the vitrification temperature of the amorphous polymer, and the preheating temperature is regulated according to practical situations.

Where, the polymer particle is selected from one or more of PE, PP, TPE, TPU, TPEE, PEBAX, PA and PET series, and can be selected and processed according to practical situations.

In summary, the device of the disclosure is simple in structure, and includes supercritical fluid delivery system 1, a mould pressing foaming system 2, a preheating quantitative feeding system 3 and a moving rail 4, wherein the supercritical fluid delivery system 1 is communicated with the mould pressing foaming system 2, the moving rail 4 is arranged under the mould pressing foaming system 2 and the preheating quantitative feeding system 3, the mould pressing foaming system 2 is arranged on the moving rail 4, and the mould pressing foaming system 2 and the preheating quantitative feeding system 3 are connected through the moving rail 4, the polymer particles are placed in the preheating quantitative feeding system 3 to be preheated and injected into the mould pressing foaming system 2, the supercritical fluid delivery system 1 introduces supercritical fluid into the mould pressing foaming system 2, the supercritical fluid is swelled and diffused toward the polymer, and the pressure release device 15 is opened for pressure relief and foaming to obtain the polymer press molding microcellular foamed product. Through the one-step foam molding method of polymer particles polymer particles are directly added into a molding mould cavity 113 without pre-foaming, addition of water and an anti-sticking separating agent is not needed, and a mould pressing welding molding process does not need high-pressure water vapor for warming and moulding, and is large in adhesion force and clean in process and suitable for polymer materials easy to hydrolyze. Meanwhile, the processing process needs few heat, the heating efficiency of the polymer particle is high, the temperature of the polymer particle is uniform, the consistency of the foaming is effectively ensured, production efficiency is improved, and automatic production is realized. The device is suitable for foaming and press molding of most polymer particles.

The above embodiments are only preferred embodiments, but embodiments of the disclosure are not limited to the above embodiments, and any other variations, modifications, substitutions, combinations and simplifications made without departing from the spirit and principle of the disclosure are all equivalent replacement manners and included within the scope of protection of the disclosure.

What is claimed is:

1. An intra-mode moulding foam molding device of a thermoplastic polymer particle, comprising a supercritical fluid delivery system (1), a mould pressing foaming system (2), a preheating quantitative feeding system (3) and a moving rail (4), wherein the supercritical fluid delivery system (1) is communicated with the mould pressing foaming system (2), the moving rail (4) is arranged under the mould pressing foaming system (2) and the preheating quantitative feeding system (3), the mould pressing foaming system (2) is arranged on the moving rail (4), the mould pressing foaming system (2) and the preheating quantitative feeding system (3) are connected through the moving rail (4), the preheating quantitative feeding system (3) comprises a polymer particle preheating device (18), a quantitative feeding device (19) and a temperature control device (20), polymer particles are added into the polymer particle preheating device (18) to be preheated, a preheating temperature is regulated through the temperature control device (20) according to the added polymer particles, and then the polymer particles are delivered into the quantitative feeding device (19); the mould pressing foaming system (2) comprises a foaming mould (11), a booster mould-clamping cylinder (12) arranged on the foaming mould (11), and a pressure release device (15) arranged on the foaming mould (11); the foaming mould (11) comprises an upper template (111) and a lower template (112); the lower template (112) is arranged on the moving rail (4); a plurality of molding mould cavities (113) are arranged between the upper template (111) and the lower template (112); the quantitative feeding device (19) is provided with a plurality of feeding heads (21) corresponding to the molding mould cavities on the lower template (112); the supercritical fluid delivery system (1) comprises a nitrogen booster station (5) and a carbon dioxide booster station (6); intake valves (10) are arranged between outlet ends of the nitrogen booster station (5) and the carbon dioxide booster station (6) and the mould pressing foaming system (2).

2. The intra-mode moulding foam molding device of a thermoplastic polymer particle according to claim 1, wherein the supercritical fluid delivery system (1) further comprises a nitrogen liquid storage tank (7) and a carbon dioxide liquid storage tank (8), an output end of the nitrogen liquid storage tank (7) is communicated with the inlet end of the nitrogen booster station (5), an output end of the carbon dioxide liquid storage tank (8) is communicated with the inlet end of the carbon dioxide booster station (6), the outlet end of the nitrogen booster station (5) is connected with the outlet end of the carbon dioxide booster station (6) and communicated with the mould pressing foaming system (2) through a pipeline (9).

3. The intra-mode moulding foam molding device of the thermoplastic polymer particle according to claim 2, wherein the mould pressing foaming system (2) further comprises a temperature control device (13), a pressure control device (14), a vent valve (16), a silencer (17) and a cooling device (22), wherein the foaming mould (11) is arranged on the moving rail (4) and moves left and right relative to the moving rail (4), the temperature control device (13) and the pressure control device (14) are arranged on the foaming mould (11), the cooling device (22) is arranged on the foaming mould (11), the silencer (17) is arranged on the pressure release device (15), the foaming mould (11) is provided with the vent valve (16), the foaming mould (11) is connected with the preheating quantitative feeding system (3) through the moving rail (4) and arranged under the preheating quantitative feeding system (3), and the supercritical fluid delivery system (1) is communicated with an inside of the foaming mould (11).

4. The intra-mode moulding foam molding device of the thermoplastic polymer particle according to claim 3, wherein circulation channels (114) communicated with the supercritical fluid delivery system (1) are provided between the lower template (112) and the molding mould cavities (113) and between the molding mould cavities (113) and the upper template (111), the lower template (112) is arranged to move left and right relative to the moving rail (4), the booster mould-clamping mould cylinder (12) is arranged on the upper template (111) and in drive connection with the upper template (111) so as to drive an up and down movement of the upper template (111), the lower template (112) is connected with the preheating quantitative feeding system (3) through the moving rail (4) and arranged under the preheating quantitative feeding system (3).

5. The intra-mode moulding foam molding device of the thermoplastic polymer particle according to claim 4, wherein the polymer particle preheating device (18) is communicated with the quantitative feeding device (19), the temperature control device (20) is arranged on the polymer particle preheating device (18), the quantitative feeding device (19) is arranged above the lower template (112).

6. A molding method for the intra-mode moulding foam molding device of the thermoplastic polymer particle according to claim 5, comprising the following steps:
   1) adding the polymer particles into the polymer particle preheating device (18) to be preheated, regulating the preheating temperature through the temperature control device (20) according to the added polymer particles, and then delivering the polymer particles into the quantitative feeding device (19);
   2) moving the lower template (112) under the quantitative feeding device (19) along the moving rail (4), adding the preheated polymer particles into the molding mould cavity (113) of the lower template (112) through the feeding heads (21) of the quantitative feeding device (19) in a predetermined weight ratio;
   3) moving the lower template (112) which completes feeding under the upper template (111) along the moving rail (4), driving the upper template (111) to downwardly move by the booster mould-clamping cylinder (12) to be locked and sealed with the upper template (112); and
   4) opening an intake valve (10), introducing supercritical fluid toward the foaming mould (11) from the supercritical fluid delivery system (1), regulating a temperature and pressure of the introduced supercritical fluid to a target temperature and a target pressure, swelling and diffusing the supercritical fluid toward the preheated polymer particles for a predetermined amount of time, opening the pressure release device (15) for pressure relief and foaming to obtain a polymer press molding microcellular foamed product having controllable product shape, size precision, pore finesse and product density.

7. The molding method for the intra-mode moulding foam molding device of the thermoplastic polymer particle according to claim 6, wherein the pressure of the supercritical fluid is 5-30 MPa, and the supercritical fluid is swelled and diffused toward the preheated polymer particles for 30-120 min.

8. The molding method for the intra-mode moulding foam molding device of the thermoplastic polymer particle according to claim 6, wherein the supercritical fluid is supercritical carbon dioxide or supercritical nitrogen or a mixture thereof.

9. The molding method for the intra-mode moulding foam molding device of the thermoplastic polymer particle according to claim 8, wherein the obtained polymer press molding microcellular foamed product has a volume expansion rate of 10-50 folds and an average pore diameter of 1-100 μm.

10. The molding method for the intra-mode moulding foam molding device of the thermoplastic polymer particle according to claim 6, wherein the preheating temperature of a semi-crystalline polymer is 5-10° C. below a melting point of the semi-crystalline polymer, and the preheating temperature of an amorphous polymer is 5-10° C. below a vitrification temperature of the amorphous polymer.

* * * * *